United States Patent [19]

Walt et al.

[11] Patent Number: 4,604,255

[45] Date of Patent: Aug. 5, 1986

[54] METHOD FOR FABRICATING MOLDED BODIES FORMED AT LEAST PARTIALLY OF SWELLED CLAY MATERIAL AND APPARATUS FOR THE PERFORMANCE OF THE METHOD

[75] Inventors: Hans Walt, Schlatt; Dieter Sütterlin, Frick, both of Switzerland

[73] Assignee: Keller Holding AG, Pfungen, Switzerland

[21] Appl. No.: 504,899

[22] Filed: Jun. 16, 1983

Related U.S. Application Data

[63] Continuation of Ser. No. 193,405, Jan. 14, 1980, abandoned.

[51] Int. Cl.$^4$ ................................................ B28B 3/00
[52] U.S. Cl. .................................. 264/273; 264/333; 264/343
[58] Field of Search ............. 264/261, 264, 266, 27.1, 264/273, 279.1, 320, 343, 333

[56] References Cited

U.S. PATENT DOCUMENTS

| 1,960,573 | 5/1934 | Butterworth et al. | 264/DIG. 63 |
| 4,108,652 | 8/1978 | Ogawa | 264/62 |
| 4,153,666 | 5/1979 | Alliegro | 264/332 |
| 4,314,961 | 2/1982 | Steinkamp | 264/332 |
| 4,460,423 | 7/1984 | Bosnia | 264/46.6 |

Primary Examiner—Donald Czaja
Assistant Examiner—V. Fischbach
Attorney, Agent, or Firm—Werner W. Kleeman

[57] ABSTRACT

With the fabrication method and apparatus for the performance of such method, a blank containing hollow spaces extending between its lower side and its upper side is arranged in a mold closed at least at five sides and expanded. The blank is arranged in a mold box, whose area in plan view is larger than the plan view area of the blank. The space between the blank and the mold box wall and possibly hollow spaces which are retained in the blank are filled with a granular filler material, for instance sand, which is trickleable at least during the mold release of the expanded blank. In this way there is ensured for a simple and positive mold release and a protection of the mold box. The molded body can have different constructions and serve the most different purposes. The molded body is preferably constructed as a lightweight structural element for construction purposes.

38 Claims, 7 Drawing Figures

METHOD FOR FABRICATING MOLDED BODIES FORMED AT LEAST PARTIALLY OF SWELLED CLAY MATERIAL AND APPARATUS FOR THE PERFORMANCE OF THE METHOD

CROSS REFERENCE TO RELATED APPLICATION

This application is a continuation of our commonly assigned, U.S. application Ser. No. 193,405, filed Jan. 14, 1980, and entitled "Method For Fabricating Molded Bodies At Least Partially of Swelled Clay Material and Apparatus For the Performance of the Method", now abandoned.

BACKGROUND OF THE INVENTION

The present invention relates to an improved method for fabricating a molded body, and also pertains to an improved apparatus for the performance of the inventive method.

A method and apparatus of the aforementioned type are known from U.S. Pat. No. 1,960,573. The blank formed of clay material is placed in a mold closed at least at five sides, and continuous hollow spaces of the blank are disposed perpendicular to the mold floor. Openings arranged in the mold floor serve for blowing through a hot gas for swelling the blank. In this publication there are mentioned different measures in order to prevent caking of the swollen blank in the mold box. Thus, among other things, there is mentioned that there can be rolled into the surface of the blank sand or the mold of the mold box can be strewn with sand. The mentioned measures however do not fulfil the purpose, since such thin sand layers become lost in the expanding blank and lose their effectiveness. The markedly expanding blank bears, under pre-stress, at the mold of the mold box. During cooling of the blank in the mold box the latter contracts more intensely than the swollen blank and fixedly clamps the same. Consequently, on the one hand, there is impossible mold release of the expanded blank even when using a sanded mold or sanded blank. Quite to the contrary, the tendency exists that the swollen blank will distort or damage the mold box.

SUMMARY OF THE INVENTION

Thus, a primary object of the invention is directed to an improved method and apparatus for fabricating molded bodies formed at least partially of swelled clay material, wherein the aforementioned drawbacks do not arise.

The inventive method of manufacturing molded bodies formed at least partially of swelled clay material, wherein in each case a blank having hollow spaces extending between its underside and its top side is arranged in a mold closed at least at five sides and swelled, is manifested by the features that the blank is arranged in a mold box, whose surface area in top plan view is larger than the surface area of the blank in top plan view. A granular filler material is arranged completely around the blank as well as in possible hollow spaces which are to be maintained, and this filler material is friable at least during the stripping from the mold of the swelled blank.

The apparatus for performing the method according to the invention comprises a charging station for loading the mold boxes with blanks, a swelling station having a heating chamber through which flows hot gas and a mold release station. Importantly, the side walls of the mold are formed in the mold box of a layer of granular filler material which is at least friable during the mold release of the swelled blank.

The thus formed molded bodies can constitute insulating elements for the most different purposes and fields of use, preferably they serve as lightweight structural elements for construction purposes.

The forming out of the swelled blank from the mold box is faultlessly ensured by virtue of the granular filler material which is at least trickleable during the mold release operation and which forms the side walls of the mold of the mold box, wherein even a possible distortion of the mold box does not have any disadvantageous effect. It has been surprisingly found that the layer of filler material, which forms the mold side walls, imparts to the light construction element to be fabricated an adequate accuracy in shape. The embedding of the granular filler material in the side walls of the molded body, especially a light construction element, additionally has been found to be advantageous since it is thus possible to improve the connection of the light construction element with a mortar mass. Finally, the filler material layers, forming the mold side walls of the mold of the mold box, protect the mold box during direct introduction of the hot gas into the hollow spaces of the blank, against too rapid heating. Consequently, the mold side walls formed of the filler material form an insulating layer, which prevents an excessive heating of the mold box and therefore damage thereto, especially distortion thereof.

The blanks are advantageously constructed of one-piece, thereby facilitating the introduction of the blanks into the mold boxes. However, there also can be used blanks formed of blank parts arranged in a row next to one another. The latter, while more difficult to arrange in the mold box, nonetheless by virtue of their parting surfaces between such blank parts arranged in rows, afford a particularly favorable structural framework, since the seam locations, just as the outer skin, as a rule have a greater density than the remaining parts of the molded body. In this case it is particularly advantageous to construct the blank so as to have hollow spaces arranged essentially parallel to one another.

It can also be advantageous to have the blank initially formed of a shell, preferably of swellable material, serving as a lost mold, in which there is arranged a pile formed of a granulate of swellable material. Here, the shell can be formed of resistant material or preferably likewise of swellable material. Heating can be accomplished for instance from below and from the top by alternately impinging with a hot gas, as such is described in the German Pat. No. 1,914,372, granted Jan. 16, 1975. There however also exists the possibility of proceeding in a manner such that the granulate is brought in a pre-heated state into the likewise pre-heated shell, up to the time of triggering the swelling operation, and then, if desired, swelled under the action of further infeed of heat. Thus, there is possible an intensive swelling of the granulate with simultaneous protection of the mold box. If desired, it is possible to dispense with the use of the shell serving as a lost form or mold, if there is used a granular filler material bonded by a binder which loses its binding properties during the swelling operation, and if there is formed from the filler material an initially shape-resistant mold into which there is introduced the granulate.

The blank can completely consist of the swellable clay material. In particular, it is however, possible to influence the strength properties of the mold body, if the blank also contains constituents of another material, preferably having swelling properties similar to the clay material, such as for instance foam glass. Thus, the abovementioned heap formed of granulate next to granulate of swellable clay material can also contain such formed of swellable glass, whereby it is possible to improve the strength of the molded body.

Of particular advantage is the technique of filling a number, preferably the outer lengthwise row, of the hollow spaces of the blank with a granular, sinterable material, for instance scrap tile and/or swellable glass, since by virtue of the introduction of the sinterable, granular material into certain hollow spaces, such can have imparted thereto a denser structure during swelling. There are thus formed zones of greater strength in the molded body to be fabricated. Such zones can be systematically arranged, for instance in that the outer longitudinal rows of the hollow spaces of the blank are filled with sinterable granular material.

There can be provided for each blank to be expanded a special mold box, particularly advantageous is however the mode of operation which contemplates arranging within a mold box a number of blanks and between such the filler material.

The invention also contemplates using a granular filler material which is bonded by a binder losing its binding properties during the swelling operation. With this mode of operation the mold formed of the filler material initially has imparted thereto an inherent strength which facilitates the forming out of the blank. By virtue of the fact that this property, however, is lost during the swelling operation, there come into play the properties protecting the mold box and the easy mold release of the expanded blank.

A particularly simple procedure is realized if the blank is initially arranged in the mold and then the filler material is introduced in a friable state.

The thickness of the layer of filler material is chosen to be at least 1 centimeter, preferably chosen to amount to 5% to 10% of the height of the blank. Such constitute particularly suitable dimensions for the thickness of the filler material layer, wherein such thickness between two neighboring blanks is chosen to be smaller than between the blank and the mold box.

The selection of a filler material which is granular and has cornered grains is particularly advantageous, since a mixture of round and cornered grains affords optimum conditions as concerns shape or dimensional stability and friability. Particularly advantageous is a filler material formed of sand which can be comminuted in a hammer mill, wherein the individual grains can possess partially round and partially broken structures. The granulation of the filler material should be chosen such that the largest grain is smaller than 50% of the thickness of the filler material layer and smaller than 40% of the diameter of the openings in the mold floor. In this way there is ensured that during mold release of the molded body the grains do not mutually block one another and hinder the outflow of the filler material. During introduction of the filler material into the mold box it is possible for excess filler material which is in the hollow spaces of the blank to escape through the openings in the mold floor. Remaining residues of filler material in the hollow spaces are not damaging. A particularly advantageous composition of the filler material has the following grain stucture:

grain size 1 to 2 mm, if desired, up to 4 mm, 40 to 60, preferably 50% by volume;
grain size 0.75 to 1 mm, 20 to 40, preferably 30% by volume; and
grain size 0.5 to 0.7 mm, being the remainder.

Since during swelling of the blank such ascends within the mold, it grows practically past the mold side walls out of the filler material. Due to the fact that there is employed a filler material containing preferably 10% to 15% by volume of a material which is swellable under the action of heat, preferably vermiculite, it is possible to obtain the result that the filler material correspondingly grows, so that during swelling of the blank there is afforded the shape stability. There is thus also advantageous a mold box having side walls protruding past the blank. In order to prevent an overflow or displacement of the filler material out of the mold box, it is particularly suitable to use a mold or molding box whose upper edges are drawn-in.

A particularly suitable filler material contains quartz sand, preferably having a low iron content, wherein a lesser iron content can cause a slight caking together of the grains, but however the friability during mild release is not impaired.

Under circumstances it is possible and advantageous to use a filler material containing a combustion aiding agent, such as carbon dust, if there should be obtained a certain post-firing and therefore post-swelling, since the combustion or firing aid agent in the filler material prolongs the heat effect.

The pre-heating time of the filler material, the mold box and the blank can be shortened by bringing the filler material in a hot or heated condition into the preferably pre-heated molding box which is equipped with blanks.

Although it is possible to introduce the hot gas from above into the hollow spaces of the blank, it has however been found to be particularly advantageous to infeed the hot gases to each hollow space of the blank which is to be closed by swelling the blank in each case through at least one opening arranged at the mold floor, preferably coaxially with respect to the hollow space axis, and the cross-section of the opening advantageously amounting to between 5% to 15%, preferably 10%, of the cross-section of the hollow space. Due to the openings which are small in relation to the cross-section of the hollow spaces there is obtained a turbulent inflow of the hot gases into the hollow spaces, so that by virtue of the intimate turbulence of the hot gases in the hollow spaces there is obtained a uniform heating of the blank. During the introduction of the hot gas through openings in the mold floor there is prevented a premature pronounced swelling of the edge of the upper hollow space. There is thus realized a more uniform swelling along the entire hollow space.

An advantageous manner of mold release contemplates emptying the blank after swelling and solidification by tilting the mold box through 180°, onto a preferably grid-shaped support, especially a conveyor belt. Due to the placement of the swelled blank upon a grid-shaped support, especially a conveyor belt, there is facilitated its further cooling.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
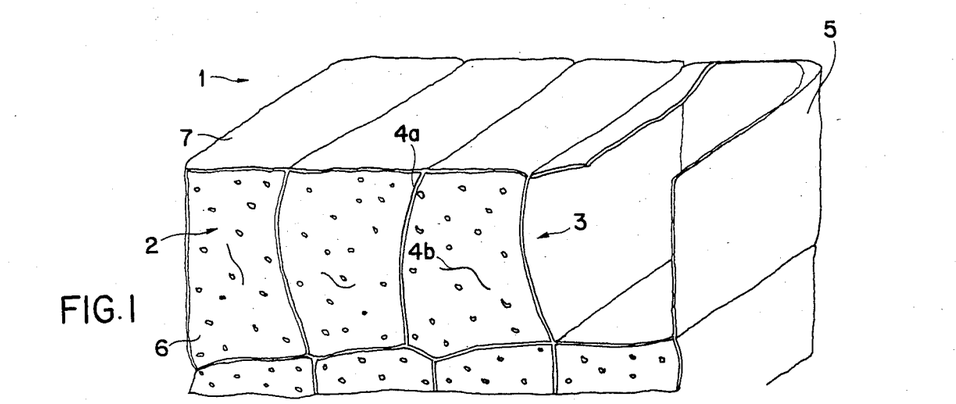
FIG. 1 depicts a light or lightweight structural element in fragmentary and perspective, partially broken away illustration.

The light or lightweight structural element 1 shown in FIG. 1 in fragmentary and perspective view comprises a base body 2 formed of swelled clay material of lesser density, through which extends a support structure 3 of greater density. The support structure comprises approximately mutually parallelly arranged support elements 4a which are of cell-like construction and support elements 4b which are of rod-like construction. The support elements extend between two mutually oppositely situated sides 5 and 6 of the light structural element. The light structural element is surrounded at five sides by a sintered skin 7, which like the support elements has a greater density than the base body 2. At the sixth side 6, as shown in FIG. 1, the sinter skin is removed. The side 6 corresponds to the open side of the mold box, where the light structural element is mechanically post-machined. The post-machining can be dispensed with, if desired, if the light structural element is post-formed in its still tough condition with a cover plate which closes the opening of the mold.

Figure 2:
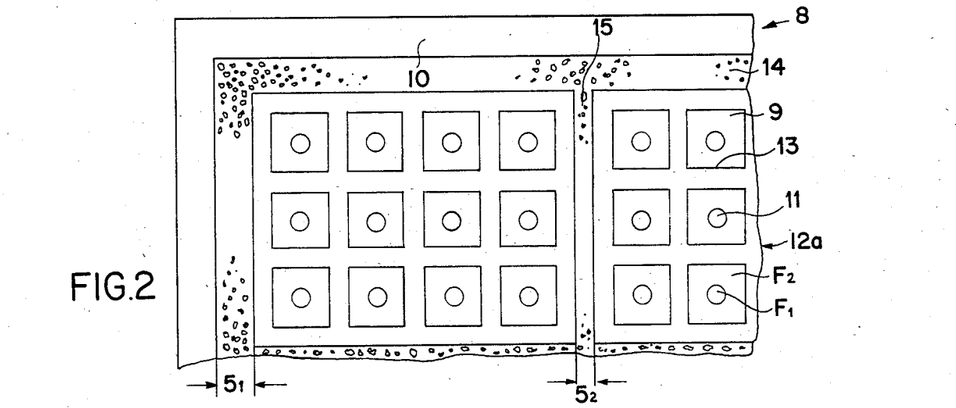
FIG. 2 depicts a mold box with one-piece blanks in plan view and in fragmentary illustration.
Figure 3:
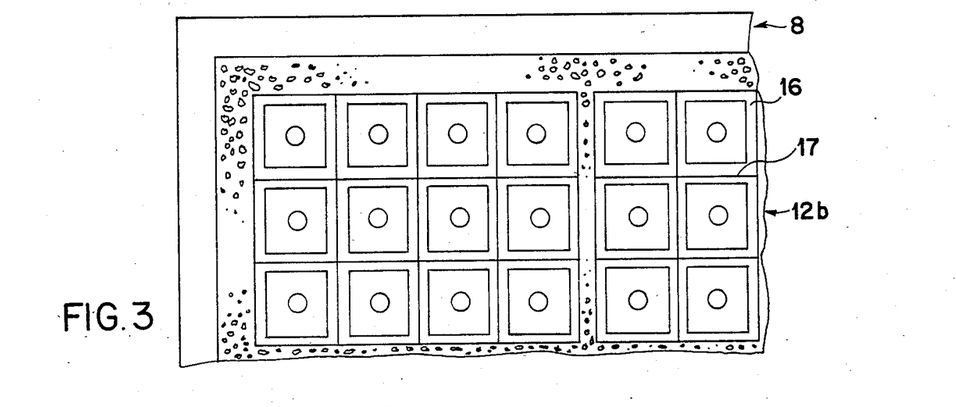
FIG. 3 illustrates a mold box with blanks formed of blank parts, shown in top plan view and in fragmentary view.

The light structural element of FIG. 1 can particularly be fabricated from blanks of the type shown in FIG. 3, wherein the joints between neighboring blank parts lead to the cell-like support elements 4a. The hollow spaces are provided by the rod-like support elements 4b. A blank of the type shown in FIG. 2 produces light structural elements, wherein the cell-like support elements 4a are practically not formed, rather only the rod-like support elements 4b.

FIG. 2 shows a mold box 8 having a mold floor 9 and side walls 10. In the mold floor 9 there are provided openings 11 for the passage of hot gas. Arranged in the mold box 8 are a number of blanks 12a, each of which is formed of one-piece and contains hollow spaces 13 which extend from one side of the blank to the other side. For each hollow space 13 there is provided an opening 11, wherein the cross-section $F_1$ of the opening 11 is smaller than the cross-section $F_2$ of the hollow spaces 13. The cross-section $F_1$ of the opening 11 advantageously amounts to 5% to 15%, preferably 10% of the cross-section $F_2$ of the hollow space 13.

The mold side walls 14 and 15 between the blank 12a and the side wall 10 of the mold box 8 on the one hand and between neighboring blanks 12a on the other hand, is formed by filling the gaps $S_1$ and $S_2$ between the blank 12a and the mold box 8 on the one hand and between neighboring blanks 12a on the other hand with friable, granular filler material which remains friable at the sintering temperature of the blank. The mold side walls 14, disposed between the blank 12a and the side wall 10 of the mold box 8, are thicker than the mold side walls 15 between neighboring blanks 12a. The mold side walls 14 possess, for instance, a thickness of 5% to 10% of the blank height, whereas the mold side walls 15 have a thickness of at least 1 cm. Also possible remaining hollow spaces, for instance for handholes, can be filled with the friable, granular filler material.

FIG. 3 shows an arrangement analogous to FIG. 2 of a blank 12b in a mold box 8, wherein however the blank 12b is not formed as one-piece, rather is assembled from the blank parts 16. These blank parts can either be loosely placed adjacent one another or bonded to one another at their joints 17. During swelling of the thus assembled blank 12a the joints 17 produce the cell-like support elements 4a described in conjunction with FIG. 1.

Figure 4:
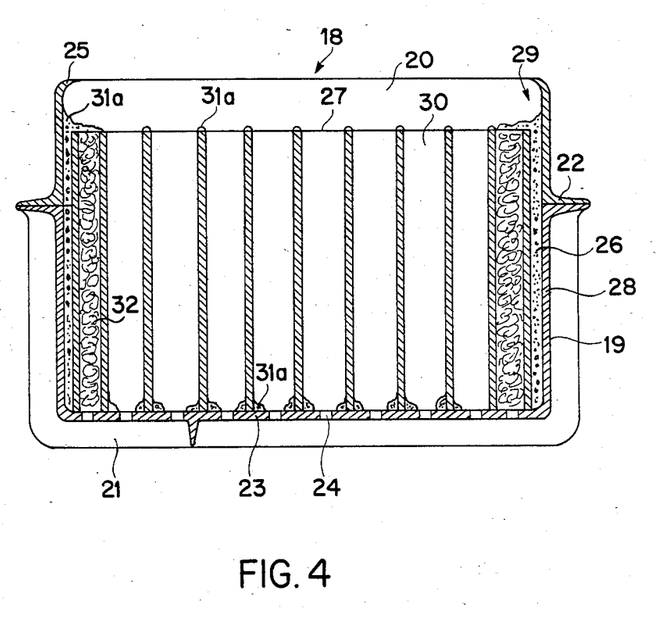
FIG. 4 illustrates a further form box with a blank in cross-sectional view.

FIG. 4 shows a further mold box 18 having a mold box lower portion 19 and a mold box upper portion 20, which is equipped with reinforcement ribs 21 and an enclosing flange 22. The mold box lower portion possesses the mold floor 23 having the openings 24 for the throughpassage of the hot gas. The upper edge 25 of the mold box upper portion 20 is somewhat drawn-in, in order to prevent outflow of the filler material 26, which is arranged between the blank 27 and the side wall 28 of the mold box and forms the mold side wall 29. Both in the hollow spaces 30 of the blank 27 as well as at its upper endfaces and at the mold side walls 29 formed of the filler material 26 there are formed, during the filling of the filler material, heaps 31a and 31b, which are either blown away due to the blowing in of the hot gas current at the swelling station or are innocuous for the ultimately formed light or lightweight structural element.

Both of the outer hollow spaces 30 of the blank 27 are filled with a granular sinterable material 32, which during swelling of the blank likewise is expanded in a certain, however lesser degree and is more dense and thus forms stronger regions of the light structural element. Such granular sinter material 32 is for instance a scrap brick. Advantageously such scrap brick consists of a clay material which is fired in a reducing atmosphere, so that it has a different swelling behaviour than the remaining blank. As a result there is formed at the region of such material a denser structure in the finished structural element. As the granular sinterable there also can be used swellable glass.

In contrast to the above-described exemplary embodiments it is also possible to arrange as the blank in the mold box initially a shell serving as a lost form and the mold is arranged of granular filler material. The shell can consist of a material which is resistant at the swelling or sinter temperatures. Preferably, the shell likewise consists of expandable material, such as swellable clay material. In this shell there can be placed a heap of granulate formed of swellable material. The entire granulate can consist of swellable clay material. It is also possible to admix granulate formed of swellable clay material with granulate of another material, having swelling properties similar to the clay material, such as for instance swellable glass. When using a mold formed of granular filler material, which is bonded by means of a binder, which loses its bonding properties during the swelling operation, it is possible, if desired, to dispense with the use of a shell. The blank can be heated from the top or from the bottom or alternately from the top and from the bottom by means of a hot gas. It is also possible to heat the granulate and the mold with the shell separately, wherein the granulate is heated until reaching the swelling temperature and then brought into the mold or into the shell, respectively. Under circumstances, it is then possible for the swelling operation to occur automatically without any further infeed of heat. If desired, it is also possible to infeed further heat. The mold box 18 of FIG. 4 can be permanent magnetic or formed of ferromagnetic material, so that such mold box can be suspended at the frame of a revolving conveyor and merely held by the magnetic forces.

The filler material preferably contains cornered and round grains, whereby there can be improved the strength of the jarring of the material. It is particularly of advantage to use a granule which has been broken in a hammer mill, which has partially round and partially broken surfaces. The largest grain of the filler material is preferably smaller than 50% of the thickness of the filler material layer which forms the mold side walls and smaller than 40% of the diameter of the openings in the mold base. It is of advantage if the filler material has the following grain structure:

grain size 1 to 2 mm, if desired, up to 4 mm, 40 to 60, preferably 50% by volume;

grain size 0.75 to 1 mm, 20 to 40, preferably 30% by volume; and grain size 0.5 to 0.7 mm, being the remainder.

As the granular filler material, which is friable at the sinter temperature of the blank, there is particularly suitable steel grit, chamotte and particularly quartz sand and corundum. The filler material, if desired, also can contain a combustion aid agent, such as carbon dust, in order to obtain a post-swelling. Additionally, carbon dust has a separating action which favors the friability of the filler material. In order to cause, during growth of the blank during the swelling operation, also a growth of the filler material layer, which forms the mold wall, it is advantageous if the filler material contains 10% to 15% by volume of a material which swells when heated, preferably vermiculite. The grain structure of the vermiculite is advantageously selected such that in the swelled condition it forms a larger grain than the largest grain of the granular filler material, so that during the preparation of the filler material there is filtered out the expanded vermiculite and removed for further use.

The granular filler material, if desired, can be bonded by means of a binder, for instance by means of an organic binder, which loses its binding properties during the swelling operation. Consequently, there is obtained a starting shape resistance which however is lost during the swelling operation. Hence, the dimensional stability of the expanding blank can be improved, without there being lost the properties which protect the molding box and the good mold release.

Figure 5:
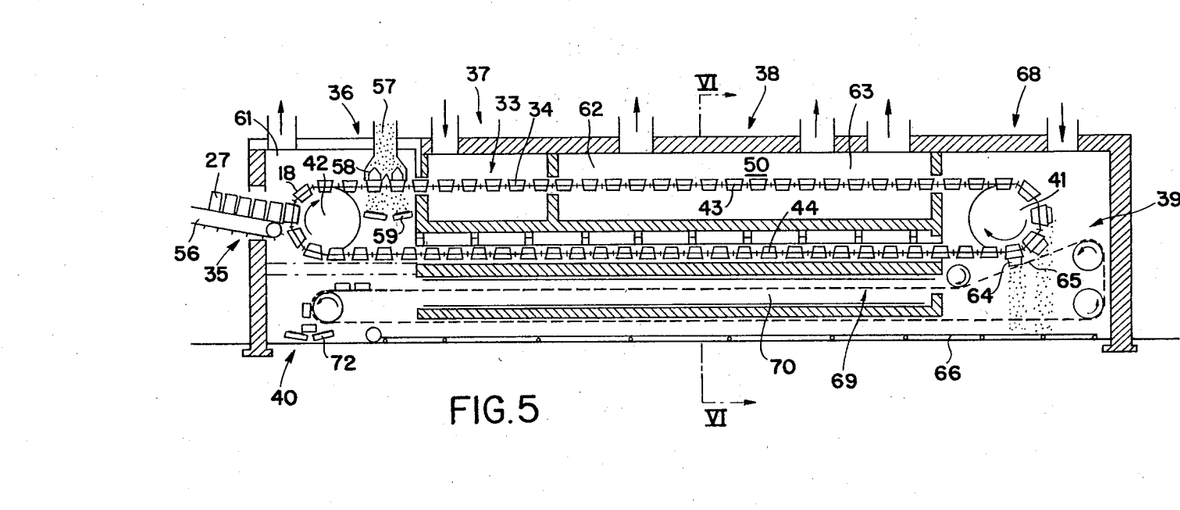
FIG. 5 is a schematic illustration of an apparatus for fabricating light or lightweight structural elements, in longitudinal sectional view.
Figure 6:
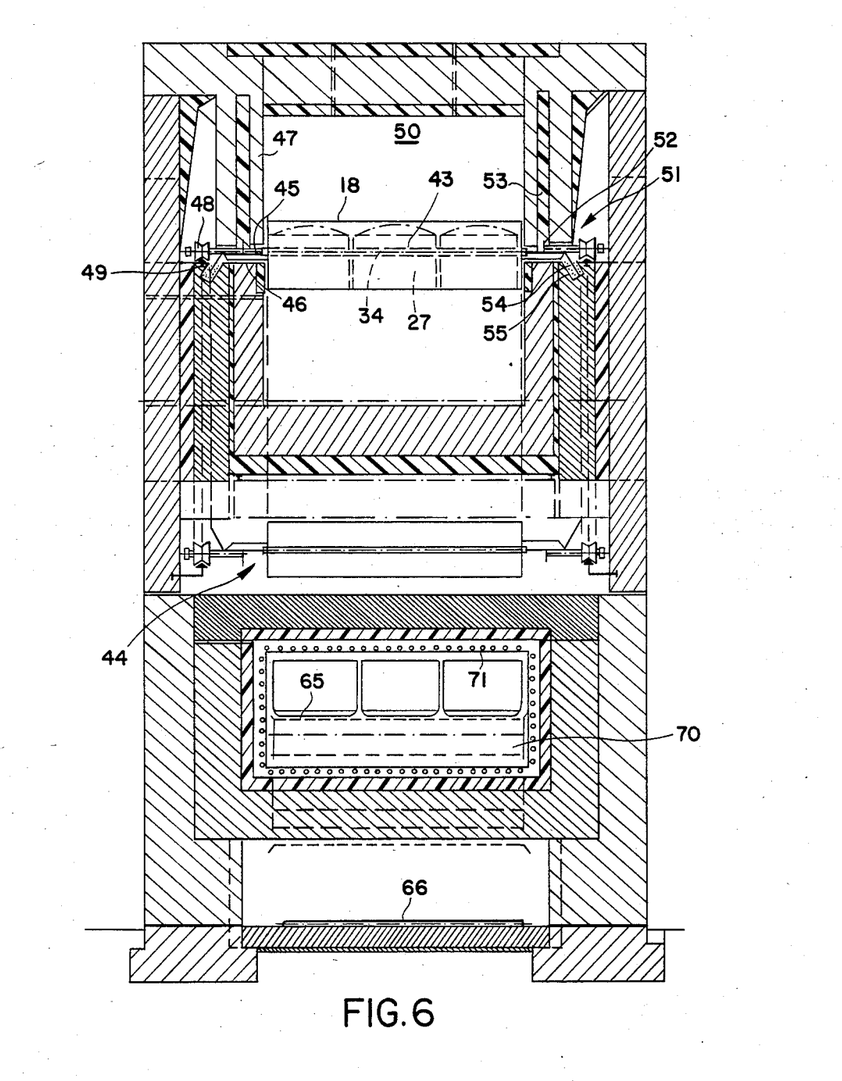
FIG. 6 shows the apparatus of FIG. 5 in a section taken along line VI—VI of FIG. 5.
Figure 7:
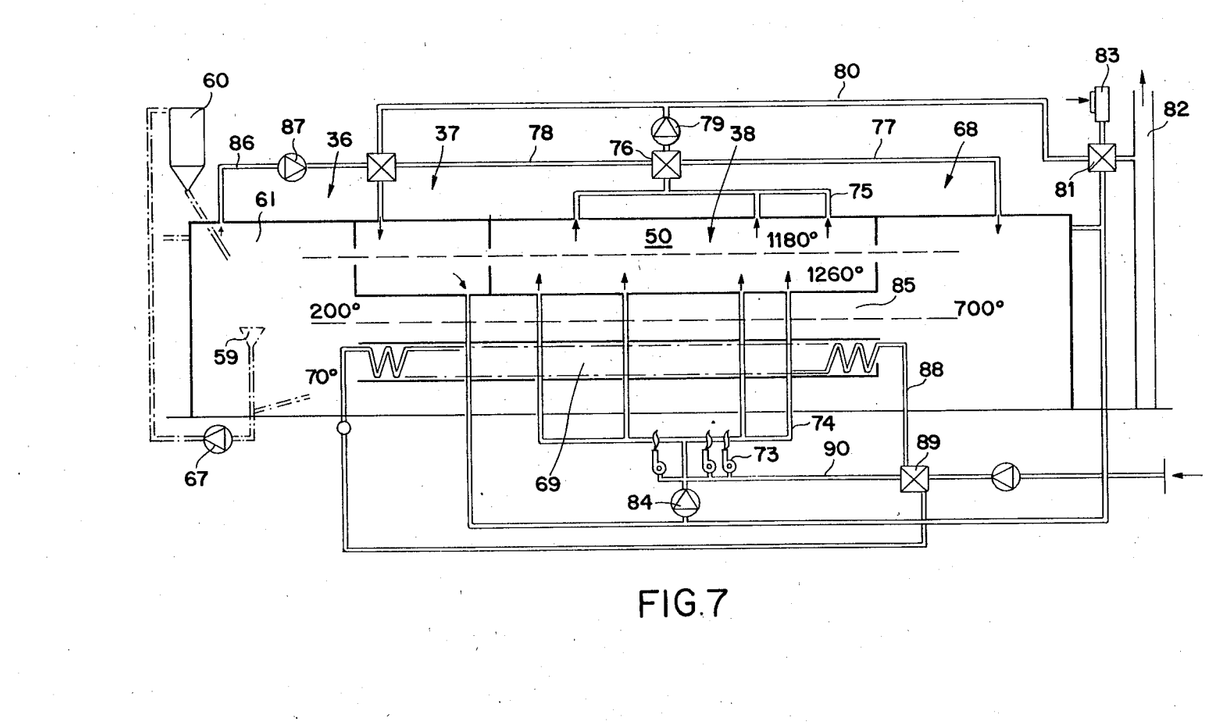
FIG. 7 illustrates the conduit plan of the apparatus of FIG. 5.

FIGS. 5 to 7 illustrate in schematic view an apparatus or installation for fabricating light structural elements with the corresponding conduit plan. This apparatus or installation is constructed as a throughpass installation, wherein the movement is accomplished by a revolving conveyor 33 composed of individual frames 34 at which there are suspended the mold boxes 18. The apparatus contains a loading station 35, a filling station 36 for the filler material, a pre-heating station 37, a swelling station 38, a mold release station 39 and a discharge station 40 for the light structural elements.

The revolving conveyor 33 is divided by means of a front revolving roll 41 and a rear driven revolving roll 42 into an upper advancing run 43 and a lower return run 44. Details of the revolving conveyor will be seen from FIG. 6. There it is shown tnat the frame 34, into which there are placed the mold boxes 18, have lateral extensions 45 which engage through lateral slots 46 in the side walls 47 of the installation. At its outer ends the extensions 45 carry rolls 48, by means of which they travel upon rails 49. The construction of the revolving conveyor 33 and the mold boxes 18 is such that the latter practically completely have the dimensions of the cross-section of the heating chamber 50. Lateral sealing devices 51 prevent escape of the hot gas through the slots 46. The sealing devices contain upper sealing elements 52, which engage into a sealing material 53 in the slot 46, as well as lower sealing elements 54 which engage into a sand bed 55 in the slot. The sealing elements 52 and 54 are arranged at the extensions 45 of the revolving conveyor 33.

The loading station 35 is arranged at the rear revolving roll 34 of the revolving conveyor 33 and possesses an infeed device 56 which infeeds the blanks 27 to the individual molding boxes 18. The charged molding boxes 18 then arrive at the filling station 36. Such contains a filling device 57 possessing a nozzle device 58 having a nozzle grid corresponding to the mold side walls in plan view. Below the upper run 43 of the revolving conveyor 33 there is arranged a catch device 59 for excess filler material, which returns the filler material back to a supply container 60. The loading station 35 and the filling station 36 are arranged in a common compartment 61 which is pre-heated by hot air sucked-off of other compartments. The filling station 36 is arranged to precede the pre-heating station 37, where there is accomplished further heating. From that location the blanks arrive at the swelling station 38, containing a heating chamber 50, which is subdivided into a further pre-heating portion 62 and into the actual swelling portion 63.

The subsequent mold release station 39 is formed by the front revolving roll 41 of the revolving conveyor 33 which tilts the mold boxes 18 through 180°, so that the swelled blanks, which now have been formed into light structural elements, can fall out together with the filler material from the mold box. To catch the light structural elements 64 there is provided a grid-shaped revolving band 65 upon which remain the light structural elements 64 and through which there can trickle the filler material and arrive at a lower situated transport band 66. The latter serves for the return of the filler material to a filler material transport blower 67 which feeds back the filler material to a supply container 60, if desired, while interposing a preparation installation. The filler material transport blower 67 conveys the filler material also from the catch device 59 of the filling station.

The mold release station 39 is arranged in the first cooling station 68, where the expanded blank is cooled until solidification. The second cooling station 69 merges with the emptying or discharge station 40 and consists of the grid-shaped revolving band 65 which is moved through a cooling channel 70. Arranged within the cooling channel 70 are cooling coils 71, through which there can be pumped in countercurrent to the conveying direction a coolant, for instance a sodium chloride brine. In the cooling channel of the second cooling station there is cooled the light structural element to approximately room temperature. With the second cooling station 69 there merges the discharge station 40, where the light structural elements 64 are loaded from the grid-shaped revolving band 65 onto a further conveyor band 72.

As best seen by referring to FIG. 7 the heating of the heating chamber 50 of the swelling station 38 is accomplished by burners 73, heating an air current in the infeed line 74, which communicates with the heating chamber 50. At that location the heating chamber 50 is heated in the actual swelling section to about 1260° C. The hot gases are withdrawn from the heating chamber 50 in a waste gas line 75 and arrive by means of a heat exchanger 76, on the one hand, by means of a branch line 77 at the first cooling station 68 and, on the other hand, by means of the branch line 78 at the pre-heating station 37. Connected with the heat exchanger 76 is a blower 79 which removes the waste gases by means of a withdrawal line 80 and a further heat exchanger 81 to a flue 82. The heat exchanger 81 serves for heating fresh air which has been sucked-up by means of a connection piece 83, which is infed by means of a blower 84 to the infeed line 74 which leads to the heating chamber 50.

The hot gases of the first cooling station 68 are infed by means of the return chute 85 of the lower run 44 of the revolving conveyor 33 to the chamber 61 of the loading station 35 and the filling station 36 and serve to heat up this chamber. By means of an outfeed line 86 and a blower 87 the exhaust air is withdrawn from the chamber 61.

The heated cooling agent in the outfeed line 88 of the cooling coil 71 flows through a heat exchanger 89 which communicates with a fresh air line 90 for the burner 73 of the heating chamber 50.

While there are shown and described present preferred embodiments of the invention, it is to be distinctly understood that the invention is not limited thereto, but may be otherwise variously embodied and practiced within the scope of the following claims. Accordingly,

What we claim is:

1. A method of manufacturing substantially cubic molded bodies comprising the steps of:
    arranging, in a mold box having a predetermined surface area in top plan view and containing sidewalls and a mold floor, on said mold floor and and between predetermined mold sidewalls made of a granular filler material at least one blank made of a blank material containing a heat-swellable clay component and having a predetermined surface area in top plan view which is smaller than said predetermined surface area in top plan view of said mold box, said at least one blank possessing an underside and a topside and a predetermined number of hollow spaces extending therebetween;
    filling a preselected number of said predetermined number of said hollow spaces with said granular filler material;
    heating said mold box containing said at least one blank at a predetermined swelling temperature in order to swell said heat-swellable clay component contained in said blank material;
    cooling said mold box containing said at least one heat-swelled blank in order to obtain a swelled and solidified blank; and
    removing said at least one swelled and solidified blank and said granular filler material which originally formed said predetermined mold sidewalls and which granular filler material is in a friable state at least during this step of removing the at least one swelled and solidified blank, in order to obtain at least one of said substantially cubic molded bodies.

2. The method as defined in claim 1, further including the step of:
    composing said at least one blank of a predetermined number of blank parts arranged in a row next to one another.

3. The method as defined in claim 1, wherein:
    said step of arranging said at least one blank in said mold box entails the step of placing at least one pre-formed blank in said mold box.

4. The method as defined in claim 1, wherein:
    said step of arranging said at least one blank in said mold box entails the steps of:
    arranging in said mold box a shell which bounds a predetermined number of spaces between said predetermined mold sidewalls and serves as a lost form; and
    placing piled amounts of said blank material containing said heat-swellable clay component in a preselected number of said predetermined number of spaces bounded by said shell.

5. The method as defined in claim 4, further including the step of:
    selecting as said shell arranged in said mold box a shell containing an expandable material.

6. The method as defined in claim 4, further including the steps of:
    preheating said mold box with said shell arranged therein to a temperature close to said swelling temperature of said heat-swellable clay component contained in said blank material;
    preheating said blank material containing said heat-swellable clay component close to said swelling temperature thereof; and
    placing said preheated blank material into said preheated shell.

7. The method as defined in claim 1, wherein:
    said step of arranging said at least one blank in said mold box entails the step of arranging a one-piece blank made of said material containing said heat-swellable clay component in said mold box.

8. The method as defined in claim 1, further including the step of:
    mixing said heat-swellable clay component of said blank material with a further component having swelling properties which are similar to the swelling properties of said heat-swellable clay component of said blank material.

9. The method as defined in claim 8, further including the step of:
    selecting swellable glass as said further component contained in said blank material.

10. The method as defined in claim 1, wherein:
    said step of arranging said at least one blank in said mold box entails the step of using at least one blank which possesses a substantially parallel arrangement of said predetermined number of hollow spaces.

11. The method as defined in claim 10, further including the step of:

filling a preselected number of said substantially parallel hollow spaces in said at least one blank with a granular, sinterable material.

12. The method as defined in claim 11, wherein:
said step of filling a preselected number of said hollow spaces in said at least one blank with said granular, sinterable material includes pre-selecting outer hollow spaces of said predetermined number of hollow spaces extending between said underside and said top side of said at least one blank.

13. The method as defined in claim 11, further including the step of:
selecting scrap tile as said granular, sinterable material.

14. The method as defined in claim 11, further including the step of:
selecting a swellable glass as said granular, sinterable material.

15. The method as defined in claim 1, wherein:
said step of arranging said at least one blank in said mold box includes the step of arranging in said mold box a predetermined number of said blanks in a spaced relationship with respect to each other; and
filling spaces formed intermediate said predetermined number of spaced blanks with said granular filler material.

16. The method as defined in claim 1, further including the step of:
bonding said granular filler material by a binder which loses its binding properties during said step of heating said mold box including said at least one blank at a predetermined swelling temperature.

17. The method as defined in claim 1, wherein:
said step of arranging said at least one blank in said mold box entails the steps of:
placing said at least one blank on said mold floor of said mold box and in a spaced relationship with respect to said sidewalls of said mold box; and
thereafter introducing said granular filler material into the spaces formed between said at least one blank and said sidewalls of said mold box in order to form said predetermined mold sidewalls.

18. The method as defined in claim 17, further including the steps of:
selecting as said grannular filler material forming said predetermined mold sidewalls a friable grannular filler material which is friable during the step of its introduction into said mold box as well as after said steps of heating and cooling said mold box containing said at least one blank.

19. The method as defined in claim 1, further including the step of:
selecting as said at least one blank, a blank having a predetermined height; and
selecting as each of said predetermined mold sidewalls formed by said granular filler material, a mold sidewall having a thickness in the range of 5% to 10% of said predetermined height of said at least one blank.

20. The method as defined in claim 19, further including the step of:
selecting as said thickness of said predetermined mold sidewalls formed by said granular filler material a thickness of at least 1 cm.

21. The method as defined in claim 1, further including the step of:

selecting as said granular filler material a filler material containing cornered grains of such filler material.

22. The method as defined in claim 1, further including the step of:
selecting as said granular filler material a filler material containing grains of a maximum grain size which is smaller than about 50% of the thickness of said mold predetermined sidewalls formed by said granular filler material.

23. The method as defined in claim 1, further including the steps of;
selecting as said mold having sidewalls and a mold floor, a mold having a mold floor which is provided with a predetermined number of openings having a predetermined diameter;
said step of arranging said at least one blank in said mold box including the step of arranging said at least one blank such that each one of said predetermined number of hollow spaces which extends between said underside and said topside of said at least one blank, is placed in flow communication with a related one of said predetermined number of openings in said mold floor; and
selecting as said granular filler material a filler material having a maximum grain size which is smaller than about 40% of said predetermined diameter of said openings in said mold floor.

24. The method as defined in claim 22, further including the step of:
selecting as said granular filler material a filler material having the following grain size composition:
grain size 1 to 4 mm, 40 to 60% by volume;
grain size 0.75 to 1 mm, 20 to 40% by volume; and
grain size 0.5 to 0.7 mm, being the remainder.

25. The method as defined in claim 23, further including the step of:
selecting as said granular filler material a filler material having the following grain size composition:
grain size 1 to 4 mm, 40 to 60% by volume;
grain size 0.75 to 1 mm, 20 to 40% by volume; and
grain size 0.5 to 0.7 mm, being the remainder.

26. The method as defined in claim 1, further including the step of:
selecting as said granular filler material a filler material containing a heat-swellable material in the range of about 10% to about 15% by volume.

27. The method as defined in claim 1, further including the step of:
selecting as said granular filler material a filler material containing grains of quartz sand of low iron content.

28. The method as defined in claim 1, further including the step of:
selecting as said granular filler material a filler material containing a combustion-aiding agent.

29. The method as defined in claim 28, further including the step of:
selecting carbon dust as said combustion-aiding agent contained in granular filler material.

30. The method as defined in claim 1, wherein:
said step of arranging said at least one blank in said mold box entails the steps of:
preheating said mold box after arranging therein said at least one blank;
preheating said granular filler material of which said mold sidewalls are to be formed; and introducing said preheated granular filler material into the spaces existing between said at least one blank and said sidewalls of said preheated mold box and thereby forming said mold predetermined sidewalls.

31. The method as defined in claim 1, further including the step of:

selecting as said mold box having sidewalls a mold box with sidewalls protruding past said at least one blank.

32. The method as defined in claim 31, further including the step of:

drawing-in an upper edge of each one of said sidewalls of said mold box and which protrudes past said at least one blank.

33. The method as defined in claim 1, further including the steps of:

selecting as said mold box having sidewalls and a mold floor, a mold box having a mold floor which is provided with a predetermined number of openings;

providing in said at least one blank with predetermined number of hollow spaces which extend between said underside and said topside of said at least one blank, a preselected number of free hollow spaces of a predetermined cross-section; and said step of arranging said at least one blank in said mold box entails arranging said at least one blank such that said preselected number of free hollow spaces communicate with related ones of said openings in said mold floor of said mold box.

34. The method as defined in claim 33, wherein:

said step of selecting said mold box having a mold floor with a predetermined number of openings includes selecting a mold box having a mold floor with a predetermined number of openings which have a predetermined cross-section in the range of 5 to 15% of said predetermined cross-section of said preselected number of free hollow spaces provided in said at least one blank; and said step of arranging said at least one blank in said mold box entails arranging said at least one blank such that said preselected number of free hollow spaces in said at least one blank extend coaxially with said related openings of said predetermined number of openings in said mold floor of said mold box.

35. The method as defined in claim 33, wherein:

said step of heating said mold box including said at least one blank entails passing hot gases through each one of said free hollow spaces provided in said at least one blank and through said related openings in said mold floor of said mold box in order to swell said at least one blank and to close each one of said free hollow spaces by swelling said heat-swellable clay component contained in said blank material.

36. The method as defined in claim 1, wherein:

said step of removing said at least one swelled and solidified blank and said granular filler material which originally formed said predetermined mold sidewalls from said mold box entrails tilting the mold box through a predetermined angle.

37. The method as defined in claim 36, wherein:

said step of tilting said mold box entails tilting said mold box through a predetermined angle of about 180°.

38. The method as defined in claim 36, further including the steps of:

providing a grid-shaped support; and tilting said mold box through said predetermined angle and thereby transferring said at least one swelled and solidified blank to said grid-shaped support.

* * * * *